UNITED STATES PATENT OFFICE.

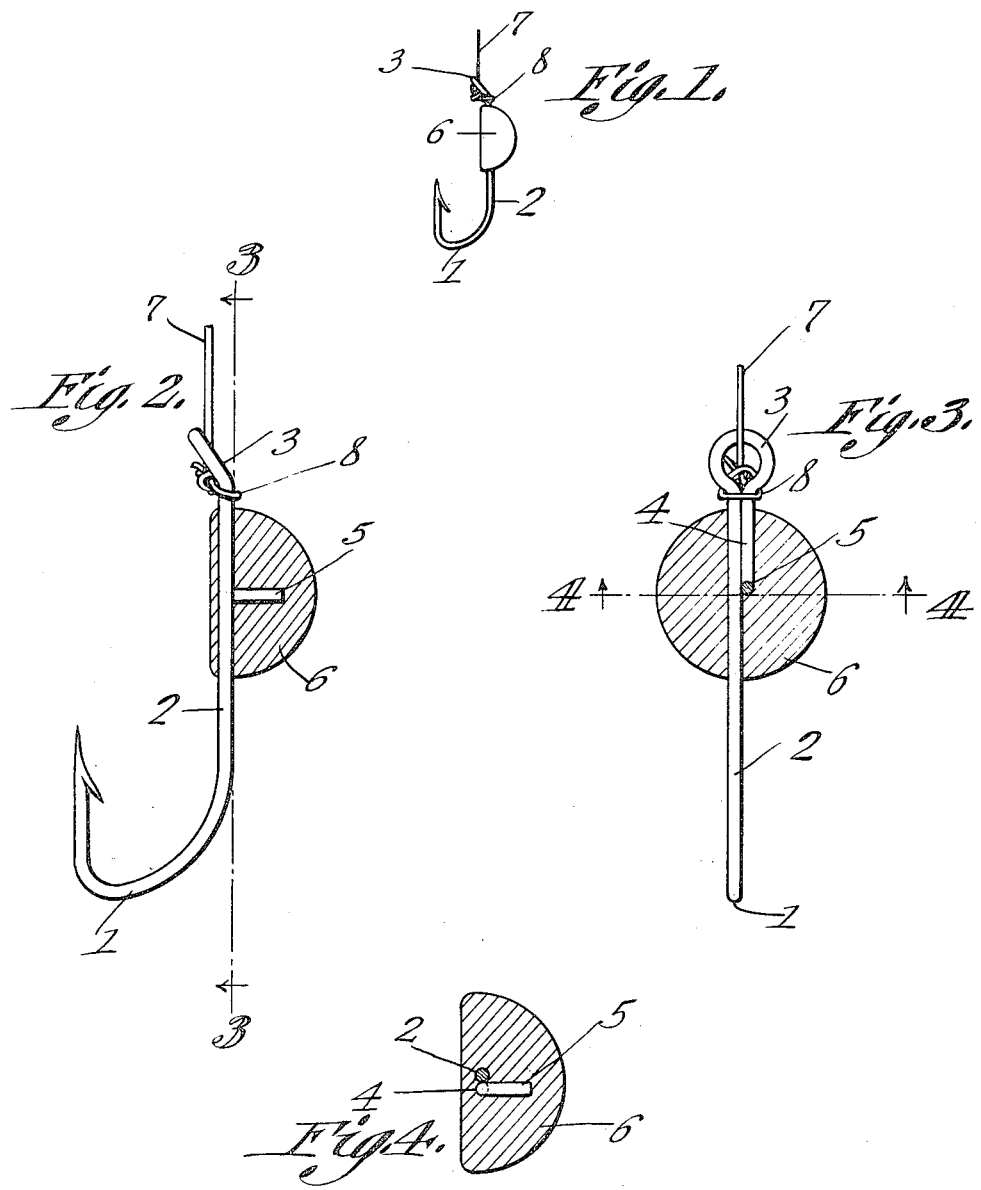

FREDERICK A. PORTER, OF BELLINGHAM, WASHINGTON.

FISH-HOOK.

1,295,370.　　　　　　　　Specification of Letters Patent.　　　Patented Feb. 25, 1919.

Application filed July 29, 1918.　Serial No. 247,191.

*To all whom it may concern:*

Be it known that I, FREDERICK A. PORTER, a citizen of the United States, residing at Bellingham, in the county of Whatcom and State of Washington, have invented a new and useful Fish-Hook, of which the following is a specification.

The device forming the subject matter of this application is a fish hook, and the invention aims to provide a fish hook wherein a sinker constitutes means for holding the eye forming parts of the hook together.

A further object of the invention is to provide novel means whereby the sinker may be securely mounted on the shank of the hook.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a fish hook constructed in accordance with the invention; Fig. 2 is a side elevation, similar to Fig. 1, on an enlarged scale, the sinker being shown in section; Fig. 3 is a section on the line 3—3 of Fig. 2, the snell being omitted; Fig. 4 is a section on the line 4—4 of Fig. 3.

The device forming the subject matter of this application may be mounted on a hook of any kind, but, in the drawings, there is shown a hook 1 including a shank 2 extended to form an eye 3 merging into an arm 4 lying along side the shank 2, the arm having a finger 5 which outstands from the arm and from the shank. The invention contemplates the use of a sinker 6 which may be of any desired form. Preferably the sinker 6 is of hemispherical configuration, and is made of metal, the sinker being fused on the shank 2, the arm 4 and the finger 5, the sinker thus constituting a means for holding together, those parts of the hook which form the eye 3. The finger 5 extends outwardly into the sinker 6 and serves as a means whereby the sinker may be fashioned readily on the shank 2 of the hook, the finger obviously serving to aid in retaining the sinker in place. The sinker 6 is provided with an external reflecting surface, so that the sinker will serve as a lure. The structure forming the subject matter of this application ordinarily is used in casting and generally is embodied in a hook about the size of the hook shown in Fig. 1, although, of course, the invention may be embodied in a hook of any size. The numeral 7 marks a snell extended through the eye 3 and having a loop 8 engaging the parts 4 and 2, above the sinker 6. The fisherman will, however, of course, adjust the snell as desired on the hook.

The device forming the subject matter of this application comprises a simple means for sinking a hook and for providing a reflecting lure, and for holding together the eye forming parts of the hook.

Having thus described the invention, what is claimed is:—

1. A fish hook having eye-forming parts, one of which is provided with an outstanding finger; and a sinker uniting said parts and mounted on the finger.

2. A fish hook having eye-forming parts, one of which is provided with an outstanding finger; and a sinker fused upon and uniting said parts, the sinker being mounted on the finger.

3. A fish hook comprising a shank, an arm, and eye uniting the shank and the arm; and a metallic sinker on the shank and receiving the arm to unite the shank and the arm and to keep the eye from opening, the eye projecting beyond the sinker.

In testimony that I claim the foregoing as my own I have hereto affixed my signature in the presence of two witnesses.

FREDERICK A. PORTER.

Witnesses:
ERAH L. FERGUSON,
RALPH RAIT.